(12) United States Patent
Anasenzl et al.

(10) Patent No.: US 12,110,596 B2
(45) Date of Patent: Oct. 8, 2024

(54) STRUCTURAL ELEMENT AND METHOD FOR PRODUCING A STRUCTURAL ELEMENT

(71) Applicant: Bayerische Motoren Werke Aktiengesellschaft, Munich (DE)

(72) Inventors: Manuel Anasenzl, Mainburg (DE); Andre Hoevelmeyer, Landshut (DE); Dominik Paulke, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 17/291,648

(22) PCT Filed: Oct. 29, 2019

(86) PCT No.: PCT/EP2019/079511
§ 371 (c)(1),
(2) Date: May 6, 2021

(87) PCT Pub. No.: WO2020/094464
PCT Pub. Date: May 14, 2020

(65) Prior Publication Data
US 2021/0404067 A1 Dec. 30, 2021

(30) Foreign Application Priority Data
Nov. 7, 2018 (DE) .................. 10 2018 127 774.1

(51) Int. Cl.
C23C 24/04 (2006.01)
B23P 13/00 (2006.01)

(52) U.S. Cl.
CPC .............. *C23C 24/04* (2013.01); *B23P 13/00* (2013.01)

(58) Field of Classification Search
None
See application file for complete search history.

(56) References Cited

U.S. PATENT DOCUMENTS

| 2004/0134646 A1 | 7/2004 | Chu et al. |
| 2015/0030379 A1* | 1/2015 | Lancaster-Larocque .................... C23C 24/04 156/305 |

(Continued)

FOREIGN PATENT DOCUMENTS

| CN | 103662084 A | 3/2014 |
| CN | 103890415 A | 6/2014 |

(Continued)

OTHER PUBLICATIONS

PCT/EP2019/079511, International Search Report dated Dec. 3, 2019 (Two (2) pages).

(Continued)

*Primary Examiner* — Michael P. Rodriguez
(74) *Attorney, Agent, or Firm* — Crowell & Moring LLP

(57) ABSTRACT

A structural part includes a pocket where the pocket is formed during or after a production of the structural part. A coating material is disposed in the pocket where the coating material at least partially fills the pocket. A method for producing a structural part includes removing or reducing material in a portion of a structural part to produce or form a pocket during or after a forming of the structural part and filling the pocket with a coating material by a coating method.

5 Claims, 1 Drawing Sheet

(56) References Cited

U.S. PATENT DOCUMENTS

2015/0360588 A1 12/2015 Flick et al.
2017/0297136 A1* 10/2017 Brown .................... C22C 38/04

FOREIGN PATENT DOCUMENTS

| CN | 104968524 A | 10/2015 | |
|----|----|----|----|
| DE | 198 32 080 A1 | 1/2000 | |
| DE | 202006009145 U1 * | 9/2006 | ............. C23C 24/04 |
| DE | 10 2006 003 818 A1 | 8/2007 | |
| DE | 10 2006 027 085 B3 | 1/2008 | |
| DE | 10 2006 057 641 A1 | 6/2008 | |
| DE | 10 2011 106 564 A1 | 1/2013 | |
| DE | 10 2012 020 814 A1 | 4/2014 | |
| DE | 10 2015 201 927 A1 | 8/2016 | |
| DE | 10 2017 209 229 A1 | 12/2018 | |
| EP | 1 829 988 A1 | 9/2007 | |
| EP | 1 867 749 A1 | 12/2007 | |
| EP | 2 177 643 A1 | 4/2010 | |
| EP | 2 503 026 A1 | 9/2012 | |
| EP | 2 722 543 A1 | 4/2014 | |
| FR | 2 630 037 A1 | 10/1989 | |
| GB | 450382 A | 7/1936 | |
| WO | WO 2013/020659 A1 | 2/2013 | |

OTHER PUBLICATIONS

German Search Report issued in German application No. 10 2018 127 774.1 dated Oct. 24, 2019, with Statement of Relevancy (Eight (8) pages).
English-language Chinese Office Action issued in Chinese application No. 201980055750.X dated Aug. 16, 2022 (Ten (10) pages).
English-language Chinese Office Action issued in Chinese application No. 201980055750.X dated Feb. 25, 2023 (Ten (10) pages).
English-language Chinese Office Action issued in Chinese application No. 201980055750.X dated Jun. 29, 2023 (Four (4) pages).

* cited by examiner

STRUCTURAL ELEMENT AND METHOD FOR PRODUCING A STRUCTURAL ELEMENT

BACKGROUND AND SUMMARY OF THE INVENTION

The present invention relates to a structural part, such as for example a cast structural part, and to a method for producing a structural part, in particular a reinforced structural part.

It is known from the prior art to coat, in particular to mechanically reinforce, structural parts and/or workpieces locally or in certain regions by applying a coating, for example by means of a thermal spraying method. In this context, DE 10 2012 020 814 A1 teaches for example a method for applying an additional material to a workpiece by means of cold gas spraying, an additional material being applied in a materially bonded manner to the surface of the workpiece in the form of elevations. The method is in particular aimed at applying partial surfaces by means of cold gas spraying, in order to stiffen the workpiece locally and thereby increase its ability to bear mechanical loads. Elevations of this type however under certain circumstances disrupt the fitting or installation and/or the further processing of the workpieces and are additionally very sensitive to impact.

It is therefore an object of the present invention to further develop structural parts which are locally reinforced in such a way and in particular to specify a method for producing them that is reliable in terms of the process.

According to the invention, a structural part comprises at least one pocket, wherein the at least one pocket is formed during or after the production of the structural part, and wherein the at least one pocket is filled with a coating material at least partially and/or in certain regions, in other words is filled with material by means of a coating method. The at least one pocket is in particular a material recess, a material cutout, a material reduction or a material removal, in particular a diminution, at least in certain regions or portions, of a wall thickness of the structural part, this diminution being refilled completely or at least partially by the coating material. Advantageously, at least when completely filling the pocket, a smooth and/or uniform surface which on the one hand can be further processed effectively and on the other hand is also visually pleasing is formed. The further processing is in particular to be understood to the effect that the region of the coating material can be used very well for fastening further (structural) parts, elements or components. Tolerances of the original structural part can advantageously be compensated for locally by way of the pocket and the filling operation with the coating material. In addition, the material introduced into the pocket is automatically "protected" by virtue of its embedding, in particular for example against impacts, which otherwise would easily lead to spalling of the layer applied by means of the coating method.

According to a preferred embodiment, the coating method is a thermal coating method. The coating method is preferably cold gas spraying, this being a method in which the coating material is applied to the carrier material at a very high speed in powder form. For this purpose, a process gas, such as for example nitrogen or helium, which has been heated to a few hundred degrees is accelerated to supersonic speed by expansion in a Laval nozzle and then the powder particles are injected into the gas jet. In the process, the injected spray particles are accelerated to such a high speed that they form a dense and firmly adhering layer upon impact with the substrate by comparison with other thermal spraying methods, even without a preceding fusing or melting operation. The advantages of cold gas spraying over other thermal spraying methods have already been described repeatedly in the prior art, and therefore are omitted in the present case.

According to one embodiment, the at least one pocket is mechanically introduced, in particular by means of milling. In this way, it is possible to create a very wide variety of pocket geometries very quickly and very precisely. In general, it should be mentioned at this juncture that the pockets can have a very different size or form. The form of the pockets advantageously results from a topology optimization. The structural part is advantageously loaded in the simulation in order to determine at which points pockets and/or local reinforcing regions should advantageously be provided.

According to one embodiment, the at least one pocket is already shaped or at least preformed during the casting of the structural part. The structural part is particularly preferably a cast structural part. The major advantage here is that the pocket can not only contribute to the local increase in stiffness or strength, but also improves the casting quality in a targeted manner, since a wall thickness of the structural part can be varied and/or adapted by way of the pocket and/or else of its dimensions. In this way, for example, solidification porosities in the structural part can be avoided in a targeted manner. In addition, dimensional tolerances can be compensated for.

According to one embodiment, the at least one pocket is completely filled with the coating material. After the filling with the coating material, a uniform, smooth and/or continuous surface is thus expediently produced. As a result of this embedding, the coating material is protected to the best possible extent. In addition, reworking of the structural part is facilitated by the uniform surface. A reworking operation of this type can comprise for example grinding or lacquering, in order to create a specific surface quality.

The pocket as such generally has a base and a peripheral region encircling it at least in certain regions. Here, the base can both have a flat and/or planar form and have a structure in order to optimize for example the adhesion of the coating material. According to one embodiment, the structure comprises projections and/or recesses, grooves, corrugations, webs and the like. The periphery mentioned above can be perpendicular to the base or substantially perpendicular or else inclined, in order to allow as it were a tapering-off and/or a smooth transition of the coating material into the surrounding material, as a result of which abrupt changes in stiffness in the structural part can be reduced. The peripheral region can also be inclined in such a way that one or more undercuts are created. The base as such can likewise run in an inclined or oblique manner and as it were transition into the periphery and/or into the peripheral regions, the expressions "inclined" and/or "oblique" referring to a surface of the structural part in the corresponding region.

According to one embodiment, a residual wall thickness of the structural part in the region of the at least one pocket amounts to at least 1 mm or at least 1.5 mm. The (minimum) wall thicknesses are advantageously geared to the casting method used, it being possible to cite die casting, gravity casting or low-pressure casting as preferred method in the present case. As an alternative, the structural part can, however, also be a shaped part and/or any desired other workpiece which has pockets or into which pockets can be introduced.

According to one embodiment, the material of the structural part is composed of a suitable non-metallic material.

According to one embodiment, the at least one pocket has a depth of at least 0.1 mm, preferably of at least 0.5 mm. The structural part can advantageously have a multiplicity of pockets which are distributed in a manner appropriate for the loading. In this respect, the depths of the pockets can be the same or in particular also different, which allows very individual adaptation to the very wide variety of load cases.

According to one embodiment, a depth of the pocket is constant or substantially constant. As an alternative, according to one embodiment, a depth of the pocket can also be formed differently. In general, a structural part of this type enables a design which is very appropriate for the loading.

According to one embodiment, a further part or structural part is fastened, in particular fastened in a materially bonded manner, to the coating material. According to one embodiment, the (structural) part is adhesively bonded on or welded on. The coating material thus advantageously forms a contact or attachment region and/or a junction point which is suitable for attaching other/further structural parts. On the one hand, the coating material enables the joining of different materials. On the other hand, dimensional tolerances of the structural part can be corrected or set locally, and consequently only where it is actually necessary, in a targeted manner. The (structural) part which is fastened to the coating material may be the structural part according to the invention. As an alternative, "another" structural part or another component is meant by this. The other structural part or the other component may be a cast structural part.

The invention also relates to a method for producing a structural part, in particular a reinforced structural part, comprising the steps of:
  removing or reducing material in certain portions on a structural part to produce or form a pocket during or after the forming of the structural part; and
  filling the at least one pocket with material and/or coating material by means of a coating method.

According to a preferred embodiment, the coating method is cold gas spraying. The advantages and features mentioned in conjunction with the structural part apply correspondingly to the method, and vice versa. According to one embodiment, the coating material is an iron-based material. In principle, a very wide variety of materials is suitable.

According to one embodiment, the method comprises the step of: extensively working a surface of the structural part over the pocket—which is filled with coating material.

This advantageously makes it possible to provide a uniform and homogeneous surface which can be easily ground and/or lacquered. In addition, the locally introduced reinforcement is well protected by the embedding.

According to one embodiment, the method comprises the step of:
  fastening a further structural part to the coating material.

The fastening operation is expediently a materially bonded fastening operation, such as welding and/or adhesive bonding. Form-fitting and/or force-fitting fastening means, for example by means of rivets or screws, are advantageously possible.

According to a preferred embodiment, the structural part is a structural part of a vehicle or structure, such as is used for example in the motor vehicle sector. It is preferably a die-cast structural part, for example of aluminum.

According to one embodiment, the structural part is a structural part of a vehicle or structure, fastened to which in the region of the coating material and/or indirectly by way of the coating material is a further structural part, which likewise can be a structural part of a vehicle or structure. The coating material expediently makes it possible to realize a connecting or junction point which meets the most stringent mechanical and dimensional demands.

Further advantages and features become apparent from the following description of schematic embodiments of a structural part with reference to the appended figures.

DETAILED DESCRIPTION OF THE DRAWINGS

Figure 1:
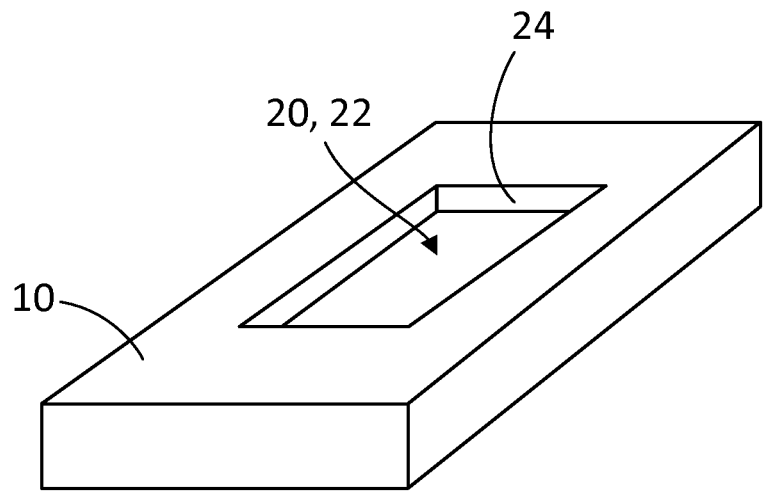
FIG. 1 shows a schematic perspective sketch of an embodiment of a structural part with a pocket.

FIG. 1 shows a structural part 10, comprising a pocket 20 which comprises a base 22 and a periphery 24. The pocket 20 has already been shaped or at least preformed during the casting of the structural part 10. In addition or as an alternative, however, the pocket 20 can also be created for example by means of milling. By means of a coating method, preferably cold gas spraying, the pocket 20 is then advantageously filled with a coating material fully or at least partially, but preferably in a manner flush into the surface of the structural part 10.

Figure 2:
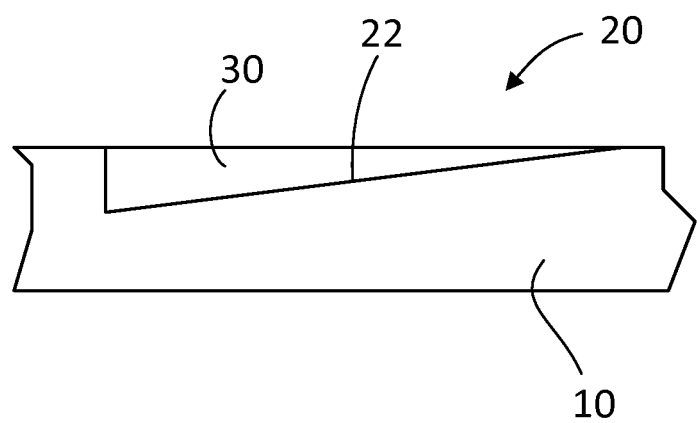
FIG. 2 shows a schematic sectional view of an embodiment of a structural part with a pocket.

FIG. 2 then shows, in a further schematic illustration, a sectional view of a structural part 10, it being possible to see a pocket 20 here which is filled with material and/or coating material 30. A form of the pocket 20 is selected here such that the base 22 thereof is inclined toward a surface of the structural part 10 and tapers off. A geometry of this type of the pocket 20 makes it possible to avoid, for example, abrupt changes in stiffness in the structural part 10, etc.

LIST OF REFERENCE CHARACTERS

10 Structural part
20 Pocket
22 Base
24 Periphery
30 Coating material, material

What is claimed is:

1. An aluminium die-cast structural part of a motor vehicle, comprising:
  a pocket, wherein the pocket is formed during a casting of the aluminium die-cast structural part, wherein the pocket is defined entirely within peripheral walls formed by the aluminium die-cast structural part and a base formed by the aluminium die-cast structural part, and wherein the base is inclined toward a surface of the aluminium die-cast structural part such that there is no abrupt change in stiffness in the aluminium die-cast structural part;
  a coating material disposed in the pocket, wherein the coating material at least partially fills the pocket and wherein the coating material is an iron-based material and wherein the coating material is disposed by cold gas spraying; and
  a further structural part of the motor vehicle, wherein the further structural part of the motor vehicle is fastened to the iron-based coating material that is disposed in the pocket by a weld or an adhesive bond or a rivet or a screw.

2. The structural part according to claim 1, wherein the coating material completely fills the pocket.

3. The structural part according to claim 1, wherein a wall thickness of the structural part at the base is at least 1 mm.

4. The structural part according to claim 1, wherein the pocket has a depth of at least 0.1 mm to the base.

5. A method for producing an aluminium die-cast structural part of a motor vehicle, comprising the steps of:
- forming a pocket during casting of the aluminium die-cast structural part, wherein the pocket is defined entirely within peripheral walls formed by the aluminium die-cast structural part and a base formed by the aluminium die-cast structural part, and wherein the base is inclined toward a surface of the aluminium die-cast structural part such that there is no abrupt change in stiffness in the aluminium die-cast structural part;
- filling the pocket with a coating material by cold gas spraying, wherein the coating material is an iron-based material; and
- fastening a further structural part of the motor vehicle to the iron-based coating material that is filled in the pocket by a weld or an adhesive bond or a rivet or a screw.

* * * * *